A. R. TALLMAN.
AUTOMOBILE DIRECTION SIGNAL OR INDICATOR.
APPLICATION FILED MAR. 9, 1916.
1,234,823.   Patented July 31, 1917.
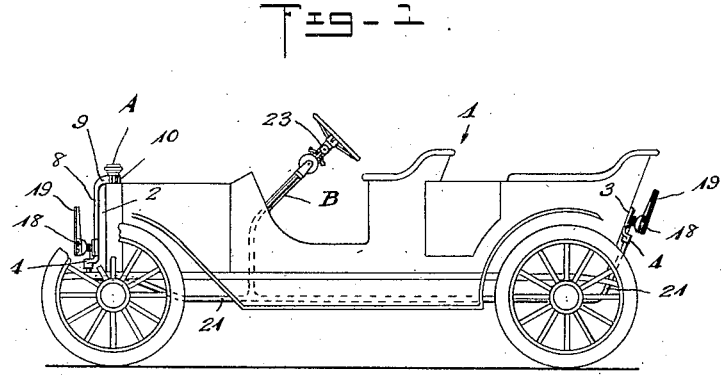
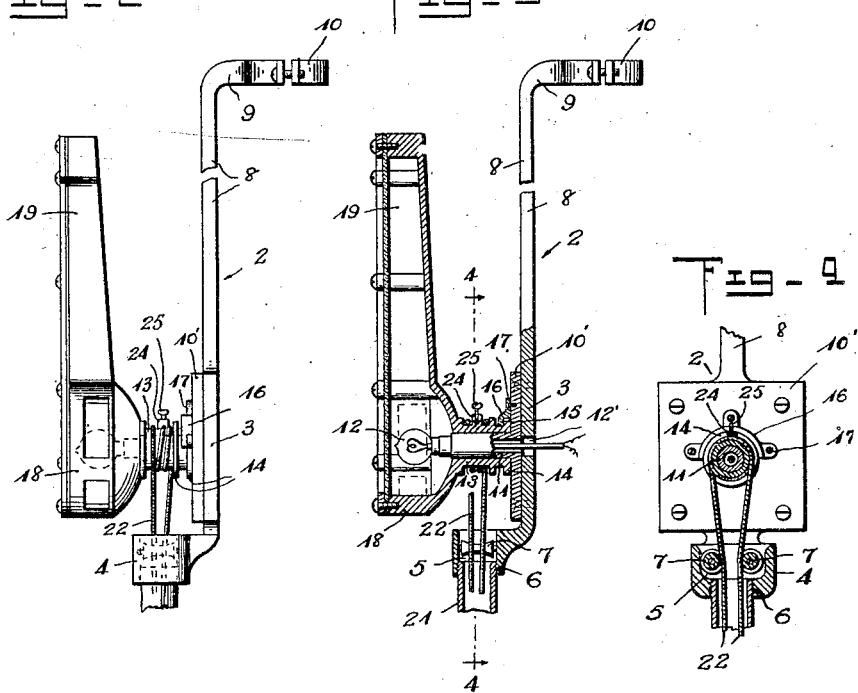
Inventor
A. R. TALLMAN.

UNITED STATES PATENT OFFICE.

ALBERT ROMAINE TALLMAN, OF NASHVILLE, TENNESSEE.

AUTOMOBILE DIRECTION SIGNAL OR INDICATOR.

1,234,823.     Specification of Letters Patent.    Patented July 31, 1917.

Application filed March 9, 1916. Serial No. 83,145.

*To all whom it may concern:*

Be it known that I, ALBERT R. TALLMAN, a citizen of the United States, residing at Nashville, in the county of Davidson and State of Tennessee, have invented certain new and useful Improvements in Automobile Direction Signals or Indicators; and I do declare the following to be a full, clear, and exact description of the invention, such as will enable others skilled in the art to which it appertains to make and use the same.

This invention relates to certain new and useful improvements in motor vehicle signals.

One of the principal objects of the invention is to provide reliable and efficient means to be displayed at the front and the rear of a motor vehicle for indicating the direction the vehicle is about to take in turning corners or rounding curves, and to indicate to pedestrians or motorists the conditions which exist in advance of the machine and the intention of the driver as to the direction to be taken.

Another object of the invention is to provide a signal or indicator at the front and rear ends of an automobile which may be illuminated at night and seen readily during the day, said indicator or signal to be operated by the driver of the machine to be turned in either direction to indicate the direction in which the driver desires to turn or to give other information to drivers of other machines and pedestrians with a view of avoiding accidents.

A further object of the invention is to provide a signal or indicator of this character, one part of which comprises a pointer having light penetrating windows in one side thereof, through which the license number may be illuminated, thus doing away with the ordinary tail light.

A still further object of the invention is to provide an improved means for mounting an indicator of this character upon the vehicle.

Still another object of the invention is to provide a device of this character which will be simple, strong, durable and inexpensive in construction, efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings, forming a part of the specification, and in which similar reference characters designate like parts throughout the several views, Figure 1 is a side elevation of an automobile showing the application of the present invention thereto;

Fig. 2 is an enlarged side elevation of one of the direction indicating pointers;

Fig. 3 is an enlarged central longitudinal sectional view through the same;

Fig. 4 is a vertical sectional view taken on the plane of the line 4—4 of Fig. 3; and Fig. 5 is an enlarged front elevation of one of the arcuate plates for retaining the pointer drums in place on their trunnions.

Referring more particularly to the drawings, the reference character 1 designates an automobile, to the front and rear ends of which are secured brackets 2. These brackets 2 each comprise a rectangular plate 3 having a lug 4 extending laterally outwardly from the lower end thereof. The lug 4 is provided on its upper side with a suitable rectangular recess 5, and extending vertically through said lug is an internally threaded opening 6, the latter communicating at its upper end with the recess 5. Revolubly mounted within this recess 5 is a pair of spaced rollers or pulleys 7, the purpose of which will be hereinafter described.

The bracket 2 at the rear end of the machine is bolted to a stationary part thereof, and is identical in construction with the bracket at the front end, except for the omission of an upright arm 8 which is provided at the upper end thereof. Extending laterally rearwardly from the upper end of the arm 8 is a tongue 9 which is bent to form one section of a two-part clamp 10, said clamp 10 being clamped around the filling nipple A of the automobile radiator, as shown in Fig. 1 of the drawings.

Bolted to each of the plates 3 is a substantially rectangular plate 10' from the central portion of which extends a tubular trunnion 11. The interior of this trunnion 11 at the outer end thereof is provided with suitable means for holding an electric light bulb 12 therein. It thus may be seen that the trunnion 11 in addition to performing its primary function, acts in the capacity of an electric lamp socket. The wires from the electric lamp bulb 12 pass rearwardly through the trunnion and through an aperture 12' arranged in the aforesaid plates 3, and then to a battery and switch (not shown), whereby the lamp is lighted at the will of the operator.

Journaled around the trunnion 11 is a cylindrical sleeve or drum 13, the inner end of which abuts the inner side of the plate 10' and is provided with a pair of spaced flanges 14 between which is disposed the offset inner edge 15 of an arcuate plate 16. This plate 16 is provided with a plurality of apertured ears 17 through which are passed suitable bolts or screws to secure the same to the plate 10'. The drum 13 is arranged in vertical alinement with the recess 5 and opening 6 in the aforesaid lug 4, as clearly shown in Figs. 3 and 4 of the drawings.

The outer end of the drum 13 is enlarged in diameter, and extending radially from one side of its enlarged portion 18 is a hollow pointer 19. Secured to the open sides of the enlarged portion 18 and pointer 19 in any suitable manner is a transparent or translucent glass or celluloid light penetrating cover 20.

Running under the frame of the machine and preferably concealed from view of the casual observer, is a horizontal tube 21, the free ends of which are bent upwardly and externally threaded for connection with the internally threaded openings 6 in the aforementioned lugs 4. Passing through the tube 21 and around the indicator drums 13 is an endless flexible element or cable 22, the latter being operatively connected to the lever 23 which is pivotally mounted in any suitable manner upon the steering post B of the automobile. This cable 22 is secured to the drums 13 by being passed through apertured lugs 24 carried by the same and having clamping thumb screws 25 thereon.

When the automobile is at a standstill it is the duty of the driver thereof to move the lever 23 so that the pointers 19 are disposed vertically pointing downwardly, but when the automobile is started the pointers are to be moved into a vertical position pointing upwardly. When the automobile is running and the driver intends to turn it to the right or left, the lever 23 is to be operated to move the pointers into a horizontal position pointing either to the right or left as the case may be. When the turn is made the pointers are to be moved to their vertical position to indicate that the machine is again to be run straight ahead. When a stop is to be made the pointers are moved to their vertical position pointing downwardly.

From the foregoing description, taken in connection with the accompanying drawings, it may be seen that the objects of the invention have been effectively carried out, a comparatively simple and efficient direction signal or indicator having been provided for signaling to other vehicles and pedestrians what movement of the machine is to be made.

The drawings merely illustrate one way in which the principle of the invention may be applied, as obviously various changes in form, proportion and in the minor details of construction may be made without departing from the spirit of this invention. Hence I do not wish to be limited to the construction herein shown other than that set forth in the appended claim.

I claim:—

A device of the class described comprising an upright plate having means for attachment to a vehicle, a trunnion projecting laterally from the outer side of said plate, a winding drum revolubly mounted upon said trunnion and carrying an indicating pointer at the outer end thereof, the inner end of said drum abutting the outer side of said plate and provided with a pair of spaced annular flanges, and an arcuate plate fixed to the above mentioned plate and having its inner edge offset laterally outwardly and received between the flanges on said drum to prevent longitudinal movement of the latter upon said trunnion.

In testimony whereof I have hereunto set my hand in presence of two subscribing witnesses.

ALBERT ROMAINE TALLMAN.

Witnesses:
 WILLIS TOWNER NIXON,
 MARY DONNELL.